(12) United States Patent
Zulawski

(10) Patent No.: US 11,976,726 B2
(45) Date of Patent: May 7, 2024

(54) CONTINUOUSLY VARIABLE TRANSMISSION WITH THE SYSTEM HAVING DIFFERENT ANGLED FACES

(71) Applicant: Dennis Zulawski, Bemidji, MN (US)

(72) Inventor: Dennis Zulawski, Bemidji, MN (US)

( * ) Notice: Subject to any disclaimer, the term of this patent is extended or adjusted under 35 U.S.C. 154(b) by 0 days.

(21) Appl. No.: 18/125,459

(22) Filed: Mar. 23, 2023

(65) Prior Publication Data
US 2023/0313867 A1    Oct. 5, 2023

Related U.S. Application Data

(60) Provisional application No. 63/327,418, filed on Apr. 5, 2022.

(51) Int. Cl.
*F16H 9/18* (2006.01)
*F16G 5/00* (2006.01)

(52) U.S. Cl.
CPC ...... *F16H 9/18* (2013.01); *F16G 5/00* (2013.01)

(58) Field of Classification Search
CPC . F16H 55/56; F16H 9/125; F16H 9/18; F16H 9/16; F16G 5/00
USPC ............................................................ 474/8
See application file for complete search history.

(56) References Cited

U.S. PATENT DOCUMENTS

| | | | | |
|---|---|---|---|---|
| 3,365,967 A | * | 1/1968 | Moogk | F16H 9/14 474/45 |
| 3,623,377 A | * | 11/1971 | Lewis | F16H 55/563 474/46 |
| 3,628,389 A | * | 12/1971 | Wiegelmann | F16H 55/56 474/46 |
| 3,656,359 A | * | 4/1972 | Dorf | F16G 5/06 474/167 |
| 3,747,721 A | * | 7/1973 | Hoff | B62M 25/00 180/338 |
| 3,783,705 A | * | 1/1974 | Moogk | F16G 5/00 474/167 |
| 3,808,900 A | * | 5/1974 | Vadeboncoeur | F16H 55/563 474/13 |
| 3,811,331 A | * | 5/1974 | Moogk | F16H 9/16 474/46 |
| 3,857,295 A | * | 12/1974 | Hall | F16G 5/00 474/265 |
| 4,116,080 A | * | 9/1978 | Berens | F16H 9/20 474/31 |
| 4,173,155 A | * | 11/1979 | Togami | A01F 12/56 474/45 |
| 4,196,641 A | * | 4/1980 | Vogel | F16H 9/16 474/36 |
| 4,283,180 A | * | 8/1981 | Rohner | B65H 54/38 474/8 |
| 4,473,367 A | * | 9/1984 | Wiegelmann | F16H 9/12 474/265 |
| 4,674,994 A | * | 6/1987 | Tomiyori | F16H 9/20 474/33 |

(Continued)

*Primary Examiner* — Henry Y Liu
(74) *Attorney, Agent, or Firm* — Westman, Champlin & Koehler, P.A.; Z. Peter Sawicki; Amanda M. Prose

(57) ABSTRACT

A continuous variable transmission (CVT) system includes a drive clutch, a driven clutch and a continuous belt wherein the sheaves on one side of the CVT system have an incline of approximately 2 degrees different from the sheaves on the other side of the CVT system. The continuous belt has opposing faces, each face matching the angles of the sheaves that the belt engages.

12 Claims, 4 Drawing Sheets

(56) References Cited

U.S. PATENT DOCUMENTS

| | | | | |
|---|---|---|---|---|
| 4,795,406 A * | 1/1989 | Dittrich | F16H 9/24 | 474/201 |
| 5,127,882 A * | 7/1992 | Mantovaara | F16H 9/125 | 474/8 |
| 5,328,412 A * | 7/1994 | Durum | F16H 55/56 | 474/8 |
| 6,206,796 B1 * | 3/2001 | Lee | F16H 9/125 | 474/84 |
| 6,293,887 B1 * | 9/2001 | Linnenbrugger | F16G 5/18 | 474/18 |
| 6,416,433 B1 * | 7/2002 | Linnenbrugger | F16H 9/125 | 474/8 |
| 6,656,068 B2 * | 12/2003 | Aitcin | F16H 55/56 | 474/14 |
| 7,070,527 B1 * | 7/2006 | Saagge | F16H 55/56 | 474/93 |
| 7,090,600 B2 * | 8/2006 | Lohr | F16H 55/563 | 474/14 |
| 7,361,108 B2 * | 4/2008 | Haas | F16H 9/18 | 474/34 |
| 9,347,521 B2 * | 5/2016 | Duke | F16G 5/20 | |
| 9,933,041 B2 * | 4/2018 | South | F16G 5/06 | |
| 10,047,859 B2 * | 8/2018 | Hattori | F16H 37/022 | |
| 10,072,742 B2 * | 9/2018 | Van Der Meer | F16H 9/18 | |
| 10,487,930 B2 * | 11/2019 | Okeson | F16H 15/52 | |
| 10,648,554 B2 * | 5/2020 | Kuhl | F16H 57/0489 | |
| 10,981,448 B2 * | 4/2021 | Safranski | B62D 63/04 | |
| 2002/0077211 A1 * | 6/2002 | Drees | F16H 9/125 | 475/210 |
| 2003/0036450 A1 * | 2/2003 | Linnenbrugger | B21L 15/00 | 474/215 |
| 2004/0018903 A1 * | 1/2004 | Takagi | F16H 9/125 | 474/8 |
| 2004/0248680 A1 * | 12/2004 | Haas | F16H 9/18 | 474/33 |
| 2011/0098144 A1 * | 4/2011 | Van Der Leest | F16H 9/125 | 474/8 |
| 2014/0235381 A1 * | 8/2014 | Yagasaki | F16H 9/125 | 474/8 |

* cited by examiner

CONTINUOUSLY VARIABLE TRANSMISSION WITH THE SYSTEM HAVING DIFFERENT ANGLED FACES

CROSS-REFERENCE TO RELATED APPLICATION

The present application is based on and claims the benefit of U.S. provisional patent application Ser. No. 63/327,418, filed Apr. 5, 2022, the content of which is hereby incorporated by reference in its entirety.

BACKGROUND

A continuously variable transmission (CVT) is an automatic transmission that can change seamlessly through a continuous range of gear ratios. The most common type of CVT uses a V-belt which runs between two variable-diameter pulleys, sometimes referred to as clutches. The pulleys consist of two inverted cone-shaped halves (sheaves) that move together and apart. The V-belt runs between the two halves (sheaves) of each of the pulleys, so the effective diameter of the pulley is dependent on the distance between the two halves of each pulley. The V-shaped cross-section of the belt causes it to ride higher on one pulley and lower on the other; therefore, the gear ratio is adjusted by moving the two sheaves of one pulley closer together and the two sheaves of the other pulley moving farther apart. The movement of the two sheaves of one pulley moving farther apart while the movement of the two sheaves of the other pulley moving toward each other results in a continuous change in gear ratios.

In each pulley one of the sheaves is stationary while the other sheave moves axially. The drive clutch movable sheave contains weights that provides a force toward the stationary sheave. As the primary or driver pulley starts to spin, the movable sheeve moves against the spring force due to a centrifugal created by the spinning weights. This forces the belt into a larger spin diameter, the faster the pulley rotates, the force increases and larger the spin diameter becomes.

Since the distance between the rotational axis of the two pulleys and the length of the belt does not change, the spin diameter of the driven pulley decreases due to the movable sheave of the driven pulley being forced away from the stationary pulley by belt tension force, resulting in the driven pulley rotating faster. Likewise, a decrease in force of the drive pulley results in a smaller spin diameter of the drive pulley which then results in a slower rotation of the driven pulley with the spring bias of the driven pulley overcoming the centrifugal force of the spinning weights of the movable sheave of the drive clutch.

In a CTV belt driven vehicle one important feature of the belt is that the belt's sides (from a cross-sectional view) are formed at an angle. The purpose of the angle and the choice of the angle is to match the angle of the conically disposed sides of the sheaves of the pulleys. The more surface area of the sheave that the sides of the belt engage, the more efficient is the transfer of power from the engine which turns the drive pulley and then the transfer of power from the drive pulley to the driven pulley which in turn then provides power to the vehicle transmission and traction devices.

One problem in present CVT's is that as the belt rides in the driven clutch, only contacting the sheaves at the bottom edge of the belt or twists the belt so one face of the belt has full contact with the sheave and the other face of the belt contacts the sheave at the bottom edge of the belt. This results in the sides of the belt not engaging the surface of the sheaves in an optimal manner. This lack of engagement results in belt slippage which causes excessive heat in the CVT system.

SUMMARY OF THE INVENTION

One embodiment of the present disclosure relates to a continuous variable transmission (CVT) system comprising a drive clutch, a driven clutch, and a continuous belt. The drive clutch comprises a stationary drive sheave and a movable drive sheave wherein the stationary drive sheave has a stationary drive sheave surface disposed at a first angle and the movable drive sheave has a movable drive sheave surface disposed at a second angle.

The driven clutch comprises a stationary driven sheave and a movable driven sheave wherein the moveable driven sheave has a moveable driven sheave surface disposed at a third angle and the stationary driven sheave has a stationary driven sheave surface disposed at a fourth angle wherein the first, second, third and fourth angles are disposed from a radial plane extending perpendicularly from respective axes of rotation wherein the first and second angles differ from each other by approximately 2 degrees and the third and fourth angles differ from each other by approximately 2 degrees.

The continuous belt engages the sheaves of both the drive clutch and the driven clutch, wherein the belt has first and second faces on opposing sides of the belt for engaging the sheaves of both the drive clutch and the driven clutch wherein the first face of the belt is disposed at an angle approximately the same as the surfaces of the stationary sheave of the drive clutch and the moveable sheave of the driven clutch and the second face of the belt is disposed at an angle approximately the same as the surfaces of the moveable sheave of the drive clutch and the stationary sheave of the driven clutch.

In another aspect of this embodiment, in the CVT system the angles of the surfaces of the stationary sheave of the drive clutch and the moveable sheave of the driven clutch are approximately the same.

In another aspect of this embodiment, in the CVT system the angles of the surfaces of the moveable sheave of the drive clutch and the stationary sheave of the driven clutch are approximately the same.

In another aspect of this embodiment, in the CVT system the first and third angles are approximately 11 degrees and the second and fourth angles are approximately 13 degrees.

In another aspect of this embodiment, in the CVT system the first and third angles are approximately 12 degrees and the second and fourth angles are approximately 14 degrees.

In another aspect of this embodiment, in the CVT system the first and third angles are approximately 13 degrees and the second and fourth angles are approximately 15 degrees.

In another aspect of this embodiment, in the CVT system the first and third angles are approximately 14 degrees and the second and fourth angles are approximately 16 degrees.

Another embodiment of this disclosure includes a belt for use in a continuous variable transmission system comprising a drive clutch wherein the drive clutch comprises a stationary drive sheave and a movable drive sheave wherein the stationary drive sheave has a stationary drive sheave surface disposed at a first angle and the movable drive sheave has a movable drive sheave surface disposed at a second angle and a driven clutch comprising a stationary driven sheave and a movable driven sheave wherein the moveable driven sheave has a moveable driven sheave surface disposed at a third angle and the stationary driven sheave has a stationary driven sheave surface disposed at a fourth angle wherein the first, second, third and fourth angles are disposed from a radial plane extending perpendicularly from respective axes of rotation wherein the first and second angles differ from each other by approximately 2 degrees and the third and fourth angles differ from each other by approximately 2 degrees, the belt comprising:

A main continuous loop body comprising a first face having an incline matching the first and third angles and a second face having an incline matching the second and fourth angles.

In another aspect of this embodiment, the first face has an incline of approximately 11 degrees and the second face has an incline of approximately 13 degrees.

In another aspect of this embodiment, the first face has an incline of approximately 12 degrees and the second face has an incline of approximately 14 degrees.

In another aspect of this embodiment, the first face has an incline of approximately 13 degrees and the second face has an incline of approximately 15 degrees.

In another aspect of this embodiment, the first face has an incline of approximately 14 degrees and the second face has an incline of approximately 16 degrees.

DETAILED DESCRIPTION

This disclosure provides a solution to the belt alignment, when maximum belt to sheaves contact area is made, during the operation of the CVT.

Figure 1:
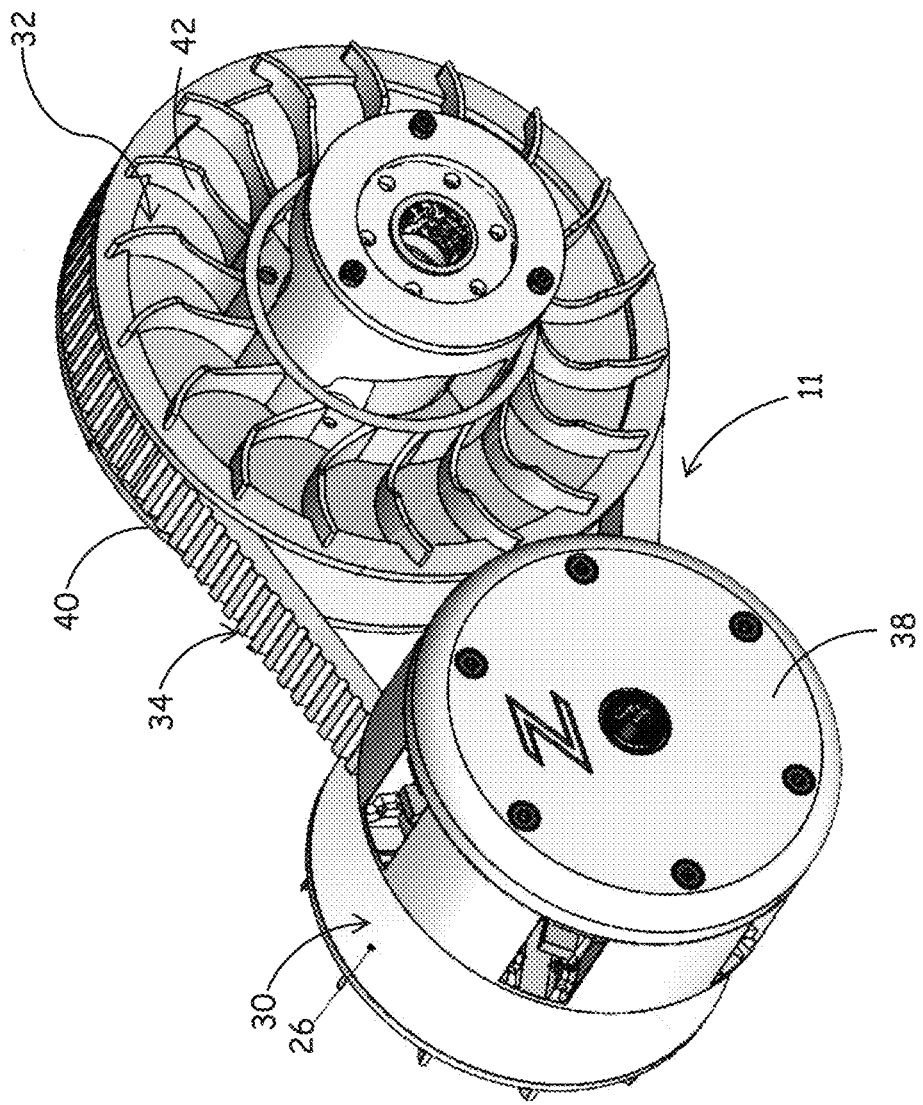
FIG. 1 is a perspective view a drive pulley and driven pulley and belt of this disclosure.

It has been discovered that a belt having sides with two different angles, that is each side of the belt with a different angle, prevents the belt from misaligning during operation. In a typical snowmobile, the drive pulleys (clutches), have an included angle of approximately 26 degrees between the sheaves and the driven pulley has an included angle of approximately 28 degrees. Belts used in a typical CVT system have angular sides of 13 degrees each, an included angle of 26 degrees. The CVT system of this disclosure is generally indicated at 11 in FIG. 1 and includes a drive clutch 30, a driven clutch 32 and a belt 34 engaging both the drive clutch 30 and the driven clutch 32. The drive clutch comprises a drive stationary sheave 26 and a drive movable sheave 38. The driven clutch 32 comprises a driven movable sheave 40 and a stationary sheave 42.

In the CVT system, the fixed sheaves control the distance the belt moves axially, and the movable sheaves control the radial distance from the fixed sheaves. When comparing the distances that the belt moves radially in Drive Clutch as compared to the Driven Clutch, it was found that the distances were different.

The axial movement (distance) is determined by the tangent of the sheave angle multiplied by the radial distance. This calculation shows that the axial distance between the two clutches is different. This axial difference equates to belt misalignment.

It was found that to correct the belt misalignment, the axial distances must be equal. If the axial distances are equal, the radial distance is determined by the belt diameter of the drive and driven clutches and the stationary sheave of the drive clutch angle set as a reference. The only variable available is the angle of the driven clutch fixed sheave. To solve for the driven clutch fixed sheave angle, the required axial distance is divided by the radial distance the belt moves in the driven clutch and solve for the tangent. The resulting tangent provides the angle of the fixed sheave of the driven clutch and the moveable sheave of the drive clutch.

The one face of the belt has the same angle as the fixed sheave of the Drive Clutch and the moveable sheave of the Driven Clutch. The other face of the belt has the same angle as the moveable sheave of the Drive Clutch and the stationary sheave of the Driven Clutch. Therefore: If the angles are the same on a given side of the system, there is full contact on the surfaces.

Figure 2:
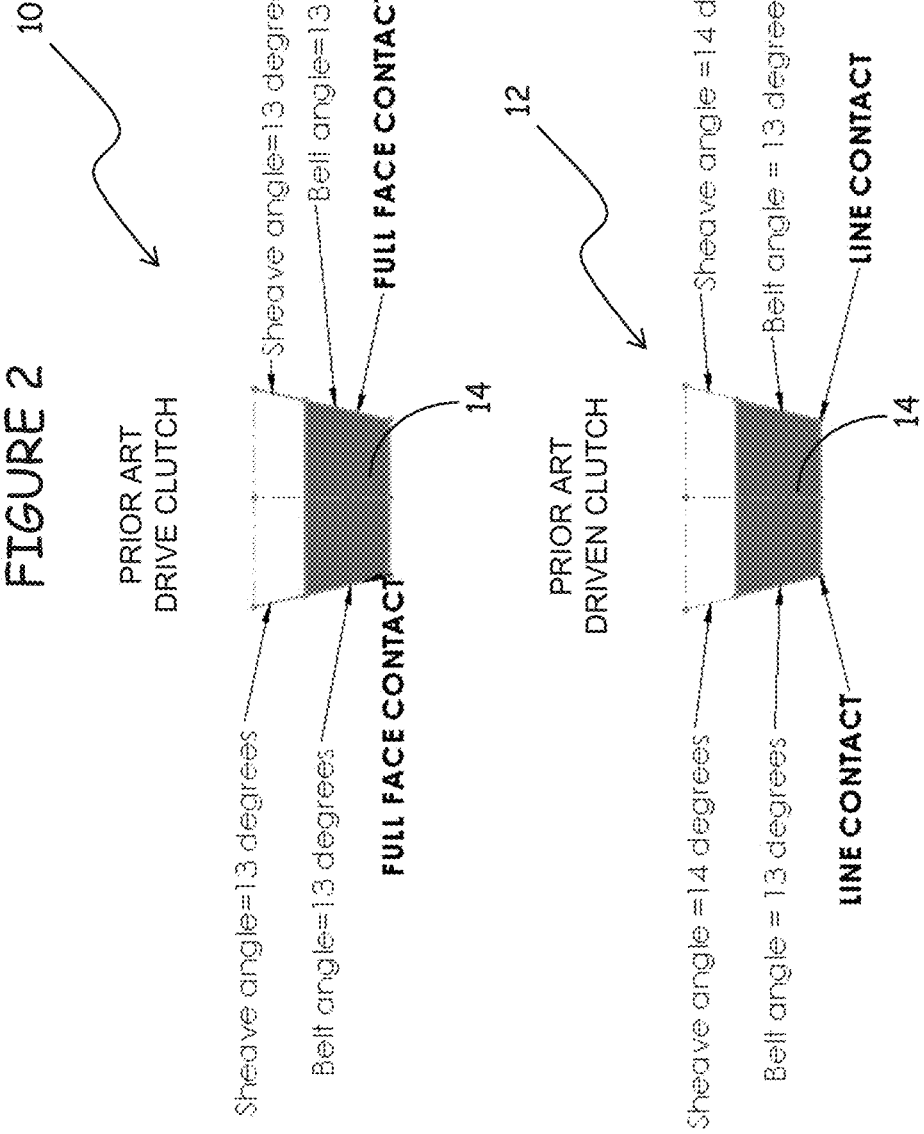
FIG. 2 is a cross sectional view of a prior art belt.

A typical prior art CVT system consists of a drive clutch 10 with sheaves having a 13-degree incline, a driven clutch 12 with sheaves having a 14-degree incline and a belt 14 whose opposing faces that contact respective sheaves are at 13 degrees (thus the included angle=26 degrees) as illustrated in FIG. 2.

The offset difference of the belt center line plane in a typical CVT system between idle shift and full shift is about 0.050 in. This offset is belt misalignment from engagement to full shift.

The contact area between the drive clutch sheaves and the belt are in full contact at 13 degrees each. The contact between the driven clutch sheaves and the belt is in line contact with the driven clutch at 14 degrees and the belt at 13 degrees. By line contact is meant that the belt and the sheave diametrically contact. Other terms used in the art for line contact include contact angle and contact area.

Figure 3:
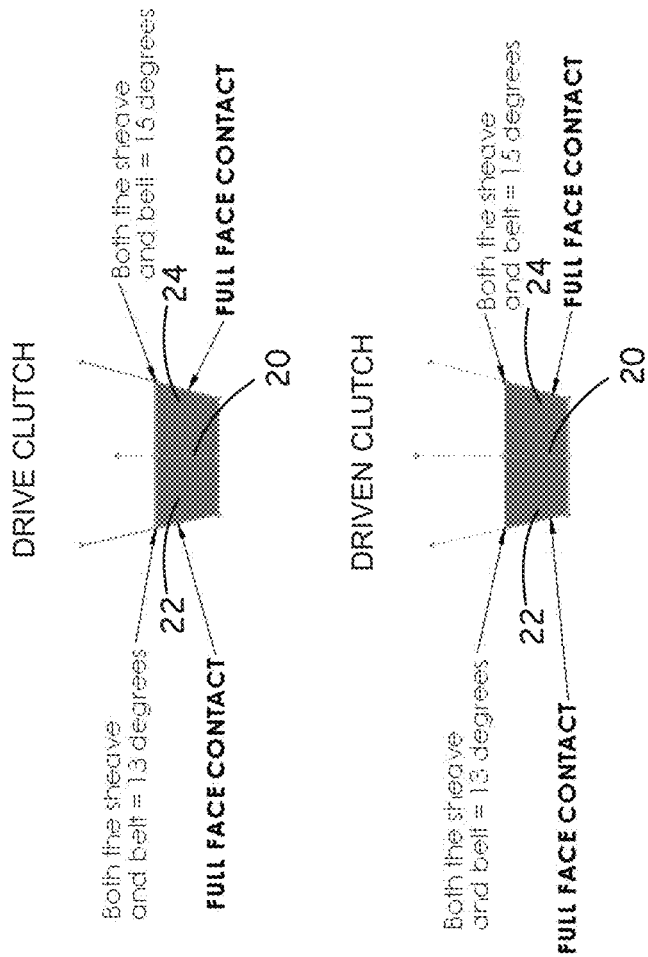
FIG. 3 is a cross sectional view of a belt of this disclosure.

As illustrated in FIG. 3, with the belt 20 of this disclosure at 13 degrees on one face 22 and 15 degrees at the other face 24 and the respective sheaves having an incline of 13 and 15 degrees to match the belt faces that contact these sheaves, there is full face contact between the belt faces and sheaves. The full-face contact reduces belt slippage considerably, if not eliminating it, which reduces heat buildup due to the belt slippage.

Figure 4:
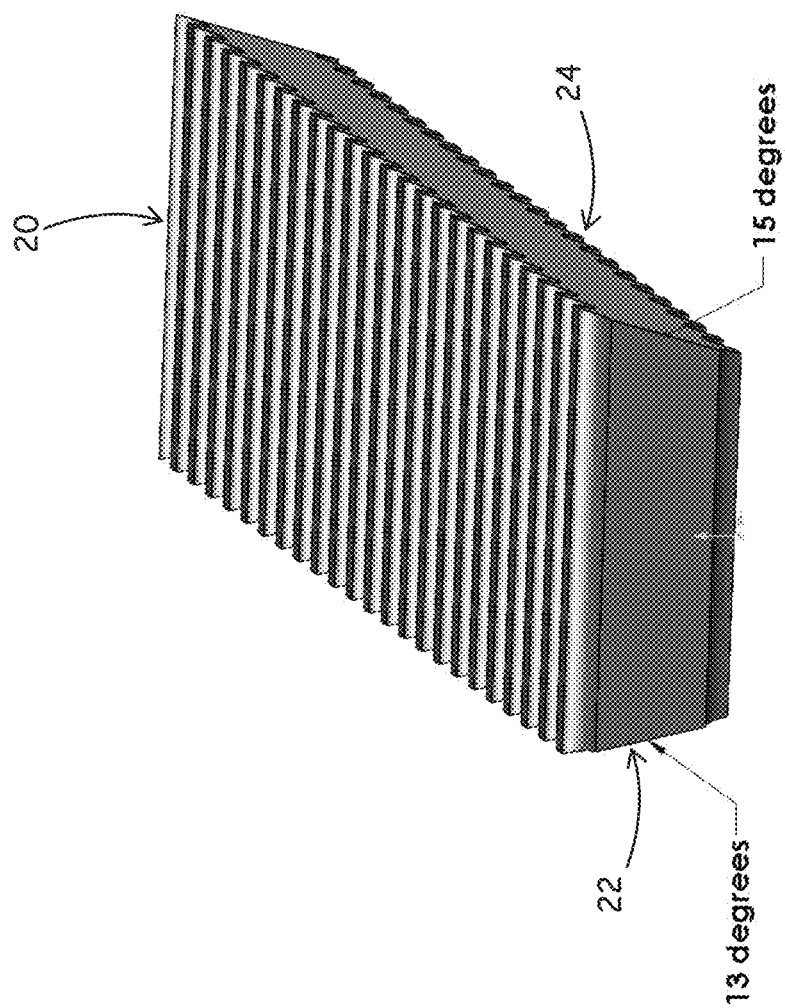
FIG. 4 is a perspective view in cross section of the belt of this disclosure.

FIG. 4 illustrates the angular faces 22, 24 of the belt 20 of this disclosure.

Several combinations of angles have been found to reduce belt slippage. One combination includes the first face of the belt having an incline of approximately 11 degrees and the second face having an incline of approximately 13 degrees while the sheaves engaging the first face have an angle of approximately 11 degrees and the sheaves engaging the second face have an angle of approximately 13 degrees.

In another combination the first face of the belt has an incline of approximately 12 degrees and the second face has an incline of approximately 14 degrees while the sheaves engaging the first face have an angle of approximately 12 degrees and the sheaves engaging the second face have an angle of approximately 14 degrees.

In another combination the first face of the belt has an incline of approximately 13 degrees and the second face has an incline of approximately 15 degrees while the sheaves engaging the first face have an angle of approximately 13 degrees and the sheaves engaging the second face have an angle of approximately 15 degrees.

In another combination the first face of the belt has an incline of approximately 14 degrees and the second face has an incline of approximately 16 degrees while the sheaves engaging the first face have an angle of approximately 14 degrees and the sheaves engaging the second face have an angle of approximately 16 degrees.

One aspect of this disclosure includes full contact of the sides of the belt with the sheaves. The above description of the sheave angles having an approximate two-degree differential is but one way to achieve full contact between the belt and sheaves.

Another method of treating the misalignment of the belt that occurs from idle shift to full shift includes keeping the sheave angles and the angle of the side of the belt at approximately 13 degrees. To compensate for the misalignment, the driven clutch could be made to float on its shaft, thereby adjusting for the misalignment as the misalignment occurs between idle shift and full shift. Using this method, the misalignment that would occur is believed to be approximately 0.125 inches or 3 mm. However, it is believed that full contact between the belt and sheaves would result Another method of treating the misalignment of the belt that occurs from idle shift to full shift includes sheaves on one side of the CVT system being approximately 1 degree different than the sheaves on the other side of the system and the belt having its opposing faces at approximately 13 degrees on one side to face the sheaves with the approximate 13-degree angles and 14 degrees on the other side of the belt to face the approximate 14-degree sheaves. results in full contact. The misalignment from idle shift to full shift results in approximately 0.050 to 0.060 inches or 1.5 mm. To compensate for the misalignment, the belt is aligned at full shift and is allowed to misalign at engagement.

What is claimed:

1. A continuous variable transmission system comprising:
a drive clutch comprising a stationary drive sheave and a movable drive sheave wherein the stationary drive sheave has a stationary drive sheave surface disposed at a first angle and the movable drive sheave has a movable drive sheave surface disposed at a second angle;
a driven clutch comprising a stationary driven sheave and a movable driven sheave wherein the moveable driven sheave has a moveable driven sheave surface disposed at a third angle and the stationary driven sheave has a stationary driven sheave surface disposed at a fourth angle wherein the first, second, third and fourth angles are disposed from a radial plane extending perpendicularly from respective axes of rotation wherein the first and second angles differ from each other by approximately 2 degrees and the third and fourth angles differ from each other by approximately 2 degrees; and
a continuous belt for engaging sheaves of both the drive clutch and the driven clutch, wherein the belt has first and second faces on opposing sides of the belt for engaging the sheaves of both the drive clutch and the driven clutch wherein the first face of the belt is disposed at an angle approximately the same as the surfaces of the stationary sheave of the drive clutch and the moveable sheave of the driven clutch and the second face of the belt is disposed at an angle approximately the same as the surfaces of the moveable sheave of the drive clutch and the stationary sheave of the driven clutch.

2. The system of claim 1 wherein the angles of the surfaces of the stationary sheave of the drive clutch and the moveable sheave of the driven clutch are approximately the same.

3. The system of claim 1 wherein the angles of the surfaces of the moveable sheave of the drive clutch and the stationary sheave of the driven clutch are approximately the same.

4. The system of claim 1 wherein the first and third angles are approximately 11 degrees and the second and fourth angles are approximately 13 degrees.

5. The system of claim 1 wherein the first and third angles are approximately 12 degrees and the second and fourth angles are approximately 14 degrees.

6. The system of claim 1 wherein the first and third angles are approximately 13 degrees and the second and fourth angles are approximately 15 degrees.

7. The system of claim 1 wherein the first and third angles are approximately 14 degrees and the second and fourth angles are approximately 16 degrees.

8. A belt for use in a continuous variable transmission system comprising a drive clutch comprising a stationary drive sheave and a movable drive sheave wherein the stationary drive sheave has a stationary drive sheave surface disposed at a first angle and the movable drive sheave has a movable drive sheave surface disposed at a second angle and a driven clutch comprising a stationary driven sheave and a movable driven sheave wherein the moveable driven sheave has a moveable driven sheave surface disposed at a third angle and the stationary driven sheave has a stationary driven sheave surface disposed at a fourth angle wherein the first, second, third and fourth angles are disposed from a radial plane extending perpendicularly from respective axes of rotation wherein the first and second angles differ from each other by approximately 2 degrees and the third and fourth angles differ from each other by approximately 2 degrees, the belt comprising: a main continuous loop body comprising a first face having an incline matching the first and third angles and a second face having an incline matching the second and fourth angles.

9. The belt of claim 8 wherein the first face has an incline of approximately 11 degrees and the second face has an incline of approximately 13 degrees.

10. The belt of claim 8 wherein the first face has an incline of approximately 12 degrees and the second face has an incline of approximately 14 degrees.

11. The belt of claim 8 wherein the first face has an incline of approximately 13 degrees and the second face has an incline of approximately 15 degrees.

12. The belt of claim 8 wherein the first face has an incline of approximately 14 degrees and the second face has an incline of approximately 16 degrees.

* * * * *